US010878409B1

(12) United States Patent
Chheda et al.

(10) Patent No.: US 10,878,409 B1
(45) Date of Patent: Dec. 29, 2020

(54) SYSTEMS AND METHODS FOR CROSS-BORDER PAYMENTS VIA DISTRIBUTED LEDGER-BASED PAYMENT RAIL

(71) Applicant: Wells Fargo Bank, N.A., San Francisco, CA (US)

(72) Inventors: Mayur Chheda, Charlotte, NC (US); Luiz Fernando Flor da Silva, Pleasant Hill, CA (US); Matthew Shepherd, Charlotte, NC (US); Kurt Paul Stevens, Lewisville, NC (US); June Ann Wroblewski, Danville, CA (US); Sean Zhang, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 44 days.

(21) Appl. No.: 16/413,358

(22) Filed: May 15, 2019

Related U.S. Application Data

(60) Provisional application No. 62/748,455, filed on Oct. 20, 2018.

(51) Int. Cl.
  *G06Q 20/10* (2012.01)
  *G06Q 20/38* (2012.01)

(52) U.S. Cl.
  CPC .......... *G06Q 20/381* (2013.01); *G06Q 20/10* (2013.01); *G06Q 20/389* (2013.01)

(58) Field of Classification Search
  USPC .................................................. 705/44, 35
  See application file for complete search history.

(56) References Cited

U.S. PATENT DOCUMENTS

| 10,410,190 B1* | 9/2019 | Kapoor | G06Q 20/381 |
| 10,521,775 B2* | 12/2019 | Hearn | H04L 9/3297 |
| 2013/0238490 A1* | 9/2013 | Bouey | G06Q 20/10 |
| | | | 705/39 |

(Continued)

OTHER PUBLICATIONS

A Multi-Chain Model for CBDC Wei-Tek Tsai, Zihao Zhao, Chi Zhang, Lian Yu, Enyan Deng (Year: 2018).*

(Continued)

*Primary Examiner* — William E Rankins
(74) *Attorney, Agent, or Firm* — Foley & Lardner LLP

(57) ABSTRACT

Systems and method relating to a distributed ledger currency rail are provided. A computer-implemented method includes receiving a funds transfer request message including an amount, a sender, and a recipient; examining the funds transfer request message to identify a sending financial institution associated with the sender and a receiving financial institution associated with the recipient; and determining whether the sending financial institution and the receiving financial institution each operates a node on a permissioned distributed ledger network. The method further includes, in response to determining that the sending financial institution and the receiving financial institution each operates a node on the permissioned distributed ledger network, routing the funds transfer request message to the permissioned distributed ledger network so as to facilitate the funds transfer via digital cash states issued to the sending financial institution and the receiving financial institution in exchange for fiat currency cash.

20 Claims, 10 Drawing Sheets

(56) References Cited

U.S. PATENT DOCUMENTS

| | | | |
|---|---|---|---|
| 2017/0300872 A1 | 10/2017 | Brown et al. | |
| 2017/0301047 A1* | 10/2017 | Brown | G06Q 20/3827 |
| 2019/0034922 A1* | 1/2019 | Castinado | G06Q 20/389 |
| 2020/0013118 A1* | 1/2020 | Treat | G06Q 20/383 |
| 2020/0074419 A1* | 3/2020 | Govender | G06Q 20/381 |

OTHER PUBLICATIONS

Blockchain based Remittances and Mining using CUDA Bhumika Ekbote, Vaishnavi Hire, Pratik Mahajan and Jignesh Sisodia (Year: 2017).*

A Distributed-Ledger Consortium Model for Collaborative Innovation Chris Khan, Antony Lewis, Emily Rutland, Clemens Wan, Kevin Rutter, and Clark Thompson, R3 (Year: 2017).*

Aitken, Roger, R3's 'Blockchain-Inspired' Payments Solution Poised to Interact with Central Bank Digital Currencies, Oct. 31, 2017. 6 pages.

How does TransferWise work and is it safe?, The Telegraph, https://www.telegraph.co.uk/money/transferwise/how-does-it-work-and-is-it-safe/ Aug. 30, 2018. 4 pages.

Revolut is coming to the U.S.A., https://www.revolut.com/us/, 2019. 9 pages.

Santander launches the first blockchain-based international money transfer service across four countries, https://www.santander.com/csgs/Satellite/CFWCSancomQP01/en_GB/Corporate/Press-room/Santander-News/2018/04/12/Santander-launches-the-first-blockchain-based-international-money-transfer-service-across-four-countries-.html, Mar. 12, 2018. 2 pages.

Zuckerman, Molly, "European Banks Complete First Live Securities Transfer on R3's Blockchain Platform", https://cointelegraph.com/news/european-banks-complete-first-live-securities-transfer-on-r3s-blockchain-platform Mar. 4, 2018. 3 pages.

* cited by examiner

Branch Settlement System – U.S. Branch

From: 09/14/2018 8:00 AM ET  To: 09/14/2018 6:00 PM ET  Currency: USD  [Search]  $0.00

| ID | Reference | Date/Time | Party | CCY | Debit | Credit | Status |
|---|---|---|---|---|---|---|---|
| cs9cksrb8snf9 | 1934845724395834 | 9/14/18, 9:02 AM ET | U.S. Branch | USD | | $10,000,000.00 | FUNDED |
| 3fssrb8snfnzb | 0034356356500005 | 9/14/18, 12:18 PM ET | Canada Branch | USD | | $750,000.00 | CONFIRMED |
| sfg2328r334c | 9134762387462322 | 9/14/18, 2:30 PM ET | Canada Branch | USD | $1,000,000.00 | | CONFIRMED |
| vst7sg6s8g33 | 9874296529456491 | 9/14/18, 5:40 PM ET | U.S. Branch | USD | $9,750,000.00 | | DEFUNDED |
| | | | | | | | |
| | | | | | | | |

FIG. 11

Branch Settlement System – Canada Branch

From: 09/14/2018 8:00 AM ET   To: 09/14/2018 6:00 PM ET   Currency: USD   [Search]

$3,250,000.00 — 802

| ID | Reference | Date/Time | Party | CCY | Debit | Credit | Status |
|---|---|---|---|---|---|---|---|
| 0p344328snf2z | 903792839172039 | 9/14/18, 9:05 AM ET | U.S. Branch | USD | | $3,000,000.00 | FUNDED |
| ss83nsfg8sndf | 398456296133243 | 9/14/18, 12:18 PM ET | Canada Branch | USD | $750,000.00 | | CONFIRMED |
| dfhy438rs234 | 987652211136232 | 9/14/18, 2:30 PM ET | Canada Branch | USD | | $1,000,000.00 | CONFIRMED |
| | | | | | | | |
| | | | | | | | |

SYSTEMS AND METHODS FOR CROSS-BORDER PAYMENTS VIA DISTRIBUTED LEDGER-BASED PAYMENT RAIL

CROSS-REFERENCE TO RELATED APPLICATION

This application claims priority to U.S. Provisional Patent Application No. 62/748,455, entitled "SYSTEMS AND METHODS FOR CROSS-BORDER PAYMENTS VIA DISTRIBUTED LEDGER-BASED PAYMENT RAIL," filed Oct. 20, 2018, incorporated herein by reference in its entirety. This application is also related to U.S. Provisional Patent Application No. 62/748,452, entitled "SYSTEMS AND METHODS FOR FOREIGN CURRENCY EXCHANGE AND TRANSFER," filed Oct. 20, 2018, and incorporated herein by reference in its entirety.

BACKGROUND

Cross-border funds transfers are growing rapidly as multinational banks and corporations continue to expand. Most cross-border transfers are handled through correspondent banking relationships, whereby a series of banks and domestic payment systems are linked together to move funds. The correspondent bank has a preexisting relationship with both the sending bank and the receiving bank and thus serves as a third-party to facilitate the transfer from the sending bank in one country to the receiving bank in another country. In addition, most cross-border transfers are facilitated via a payment network, such as Society for Worldwide Interbank Financial Telecommunications ("SWIFT"), to communicate payment request and payment instruction messages from the sending bank to the correspondent bank and from the correspondent bank to the receiving bank.

SUMMARY

One embodiment related to a computer-implemented method. The method includes receiving a funds transfer request message including an amount for the funds transfer, a sender of the funds transfer, and a recipient of the funds transfer; examining the funds transfer request message to identify a sending financial institution associated with the sender and a receiving financial institution associated with the recipient; and determining whether the sending financial institution and the receiving financial institution each operates a node on a permissioned distributed ledger network. The method further includes, in response to determining that the sending financial institution and the receiving financial institution each operates a node on the permissioned distributed ledger network, routing the funds transfer request message to the permissioned distributed ledger network so as to facilitate the funds transfer via digital cash states issued to the sending financial institution and the receiving financial institution in exchange for fiat currency cash.

Another embodiment relates to a system associated with a sending financial institution in a funds transfer. The sending financial institution operates a node on a permissioned distributed ledger network. The system includes a network interface, a customer accounts database storing information related to various customers of the sending financial institution, and a processing circuit. The processing circuit includes a processor and a memory. The memory is structured to store instructions that are executable and cause the processor to receive the transfer request message comprising an amount for a funds transfer, a sender of the funds transfer, and a recipient of the funds transfer; examine the funds transfer request message to identify the sender as a customer of the sending financial institution and to identify a receiving financial institution associated with the recipient; and determine whether the receiving financial institution operates a node on the permissioned distributed ledger network. The instructions further cause the processor to, in response to determining that the receiving financial institution operates a node on the permissioned distributed ledger network, route the funds transfer request message to the permissioned distributed ledger network so as to facilitate the funds transfer via digital cash states issued to the sending financial institution and the receiving financial institution in exchange for fiat currency cash.

Another embodiment relates to a system associated with a receiving financial institution in a funds transfer. The receiving financial institution operates a node on a permissioned distributed ledger network. The system includes a network interface, a customer accounts database storing information related to various customers of the receiving financial institution, and a processing circuit. The processing circuit includes a processor and a memory. The memory is structured to store instructions that are executable and cause the processor to receive the transfer request message comprising an amount for a funds transfer, a sender of the funds transfer, and a recipient of the funds transfer; examine the funds transfer request message to identify the recipient as a customer of the receiving financial institution and to identify a sending financial institution associated with the sender; and determine whether the sending financial institution operates a node on the permissioned distributed ledger network. The instructions further cause the processor to, in response to determining that the sending financial institution operates a node on the permissioned distributed ledger network, route the funds transfer request message to the permissioned distributed ledger network so as to facilitate the funds transfer via digital cash states issued to the sending financial institution and the receiving financial institution in exchange for fiat currency cash.

BRIEF DESCRIPTION OF THE DRAWINGS

Various objects, aspects, features, and advantages of the disclosure will become more apparent and better understood by referring to the detailed description taken in conjunction with the accompanying drawings. In the drawings, like reference numbers generally indicate identical, functionally similar, and/or structurally similar elements.

FIG. 11 is a U.S. branch view of a user interface for facilitating a cross-border payment between the U.S. branch and a Canada branch via a distributed ledger technology-based payment rail, according to an example embodiment.

FIG. 12 is a Canada branch view of a user interface for facilitating a cross-border payment between a U.S. branch and the Canada branch via a distributed ledger technology-based payment rail, according to an example embodiment.

DETAILED DESCRIPTION

Figure 1:
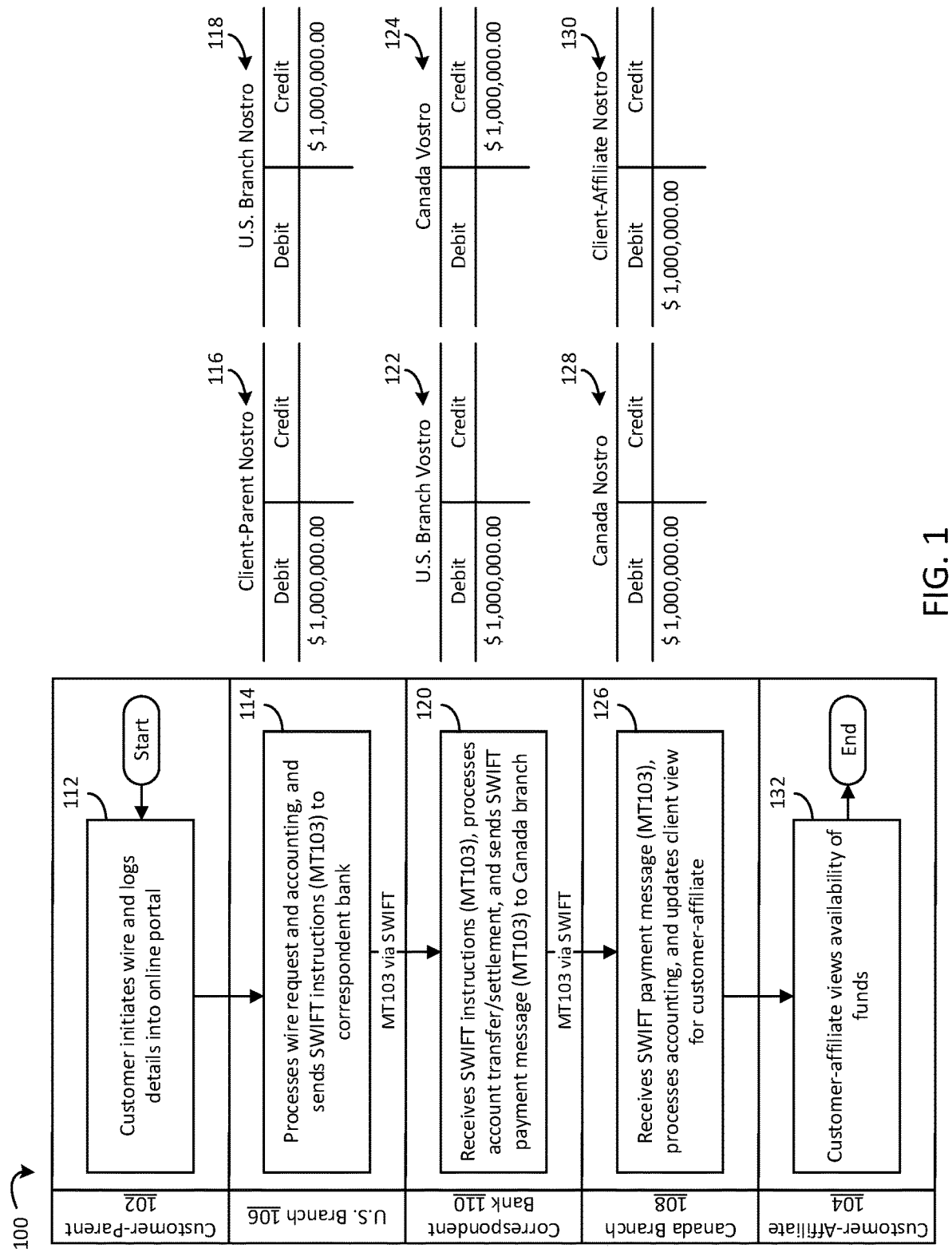
FIG. 1 is a flow diagram of a method of performing a cross-border interbank funds transfer using existing financial systems, and corresponding T-account tables for the funds transfer, according to an example embodiment.

Referring now to FIG. 1, a flow diagram of a method 100 of performing a cross-border interbank funds transfer using existing financial systems, and corresponding T-account tables for the funds transfer, is shown, according to an example embodiment. The example illustrated in FIG. 1 relates to a U.S.-based multi-national company transferring $1,000,000 from a U.S.-based account 102 (labeled in FIG. 1 as "Customer-Parent") to a Canada-based account 104 (labeled in FIG. 1 as "Customer-Affiliate)". The U.S.-based account 102 is held with a U.S. branch 106 of a financial institution, and the Canada-based account 104 is held with a Canada branch 108 of the financial institution. In other words, this example involves a cross-border, intra-bank, inter-branch transfer. The cross-border, intra-bank, inter-branch transfer is facilitated via a correspondent bank 110.

The U.S. branch 106 and the Canada branch 108 each holds correspondent accounts with the correspondent bank 110. For example, the U.S. branch 106 and the Canada branch 108 each holds a nostro account with the correspondent bank 110. In this example, the nostro accounts are commercial banking accounts. From the perspective of the correspondent bank 110, these accounts are vostro accounts that the correspondent bank 110 manages on behalf of each of the U.S. branch 106 and the Canada branch 108. The nostro/vostro accounts provide liquidity to facilitate transfers to and from the respective U.S. branch 106 and the Canada branch 108. In this example, the funds are transferred and received in the same currency, and the correspondent bank 110 is the same financial institution that operates the U.S. branch 106 and the Canada branch 108. However, in some examples, such as those involving foreign exchange, the correspondent bank 110 may be a third-party financial institution. Additionally, in some examples, the foreign currency transfer may be transferred and received in different currencies (e.g., as facilitated by the correspondent bank 110).

At 112, the customer-parent initiates a wire transfer from the U.S.-based account 102 to the Canada-based account 104. For example, the customer-parent may initiate the wire by logging into an online banking platform and submitting the wire transfer request.

At 114, the U.S. branch 106 processes the wire transfer request and associated accounting, and sends payment instructions to a payment network. In the example illustrated in FIG. 1, the payment network is SWIFT and the payment instructions are sent via a "Message Type" MT103 payment message. Accounting for this step is shown in T-accounts 116, 118. In T-account 116, the nostro account of the customer-parent is debited $1,000,000. In T-account 118, the nostro account of the U.S. branch 106 is credited $1,000,000.

At 120, the correspondent bank 110 receives the payment instructions from the U.S. branch 106. The correspondent bank 110 processes the account transfers and facilitates settlement between the respective vostro accounts for the U.S. branch 106 and the Canada branch 108. For example, the correspondent bank 110 sends an MT103 payment message to the Canada branch 108. Accounting for this step is shown in T-accounts 122, 124. In T-account 122, the vostro account for the U.S. branch 106 (e.g., from the perspective of the U.S. branch 106, the same account as the nostro account of the U.S. branch 106) is debited $1,000,000. In T-account 124, the vostro account for the Canada branch 108 (e.g., from the perspective of the Canada branch 108, the same account as the nostro account of the Canada branch 108) is credited $1,000,000.

At 126, the Canada branch 108 receives the MT103 payment message from the correspondent bank 110 and processes accounting for the transfer. Accounting for this step is shown in T-accounts 128, 130. In T-account 128, the nostro account for the Canada branch 108 is debited $1,000,000. In T-account 130, the nostro account for the customer-affiliate is credited $1,000,000. At 132, the customer-affiliate can view the availability of the $1,000,000 received from the customer-parent via the wire transfer.

There are various technical challenges associated with cross-border interbank funds transfers using existing financial systems, as illustrated by example in FIG. 1. For example, existing systems require a payment network such as SWIFT to communicate payment request and payment instruction messages from the sending bank to the correspondent bank and from the correspondent bank to the receiving bank. Each SWIFT message costs a fee. Such fees can add up to significant costs for entities that conduct a large number of transactions.

Existing cross-border transfer systems are also slow. SWIFT does not actually send funds; SWIFT simply sends messages between banks. Because of this, other systems that require more human intervention must be used to complete the actual funds transfer, and this, in turn, makes SWIFT transfers slow. Additionally, cross-border transfers often involve transferring funds across different time zones. This can further delay transfers because certain banks do not process transactions outside of business hours. Further still, certain cross-border payments must traverse through several correspondent banks, each of which delays settlement and charges additional fees. The slow nature of cross-border transfers provides inefficiencies regarding banks' ability to manage liquidity of their nostro accounts. Accordingly, banks often overfund nostro accounts or excessively utilize credit lines.

Settlement and reconciliation is also problematic with existing cross-border payment systems. Each entity in existing cross-border transfer systems maintains its own general ledger and accounting system for managing customer accounts. Because no two banks can agree on a transaction based on their own ledger, SWIFT came into being to guarantee and confirm message transmission. Reconciliation can also be problematic if the payment messages contain errors or omissions. Unreconciled or unconfirmed payment messages can require substantial human effort to manually fix problematic payment messages.

Various embodiments relate to a distributed ledger technology ("DLT")-based system for facilitating cross-border payments. The system provides a new DLT-based rail for cross-border payments that co-exists with exiting rails for clearing, netting and settlement. The system includes an issuer that generates and issues digital cash states in exchange for fiat currency cash. The digital cash states are recorded and transferred via a distributed ledger that mirrors the bank's existing general ledger. Cross-border payments are facilitated by transferring digital cash states between banks via the distributed ledger system. This eliminates the need for utilizing the SWIFT messages and other payment rails (e.g., Fedwire) to facilitate cross-border payments. Additionally, the DLT-based system is operable with existing payment rails and accounting methodology. Therefore, the system requires minimal effort to be implemented with existing systems.

The DLT-based system for facilitating cross border payments solves various technical problems and provides various technical advantages over existing systems. For example, the DLT-based system eliminates fees for existing payment messages systems such as SWIFT. Instead, payment messages are transmitted via the distributed ledger, which requires minimal cost to operate and maintain. Additionally, use of an independent third-party issuer as described in further detail below may ease the burden of foreign regulatory compliance, as any given country has a cleaner "line-of-sight" to the underlying assets, which are all held by an independent third-party account.

The DLT-based system also facilitates real-time or near real-time settlement of cross-border payments. For example, customers may make real-time transfers between branches of an accounts provider on a 24/7 basis, rather than requiring third party intermediaries and associated operating window limits. This may reduce the complexity of servicing, as an illustration, the needs of multi-national customers who want to move money between their entities in various jurisdictions. This also improves the ability for banks to optimize the liquidity of their nostro/vostro accounts so as to prevent overfunding or underfunding these accounts. Further, this facilitates more efficient deployment of capital by bank branches, as more accurate knowledge of point-in-time account status enables lowering of customer/bank capital that is tied up and can instead be deployed in the market for a return.

Additionally, the DLT-based system provides a single record of transactions that is distributed amongst nodes. This eliminates the need for reconciliation because transactions are finalized when cash states exchange ownership. Thus, finality is reached more quickly than with traditional payment rails. Moreover, using a single ledger avoids a batch reconciliation process, thus saving resources.

The DLT-based system also provides technical advantages over other distributed ledger solutions for cross-border payments. Other distributed ledger systems may be capable of facilitating cross-border payments but are not compatible with existing banking systems, payment rails, and/or standard banking accounting practices. In contrast, the existing DLT-based system is structured to route certain payment instructions to the DLT network for settlement thereon.

Figure 2:
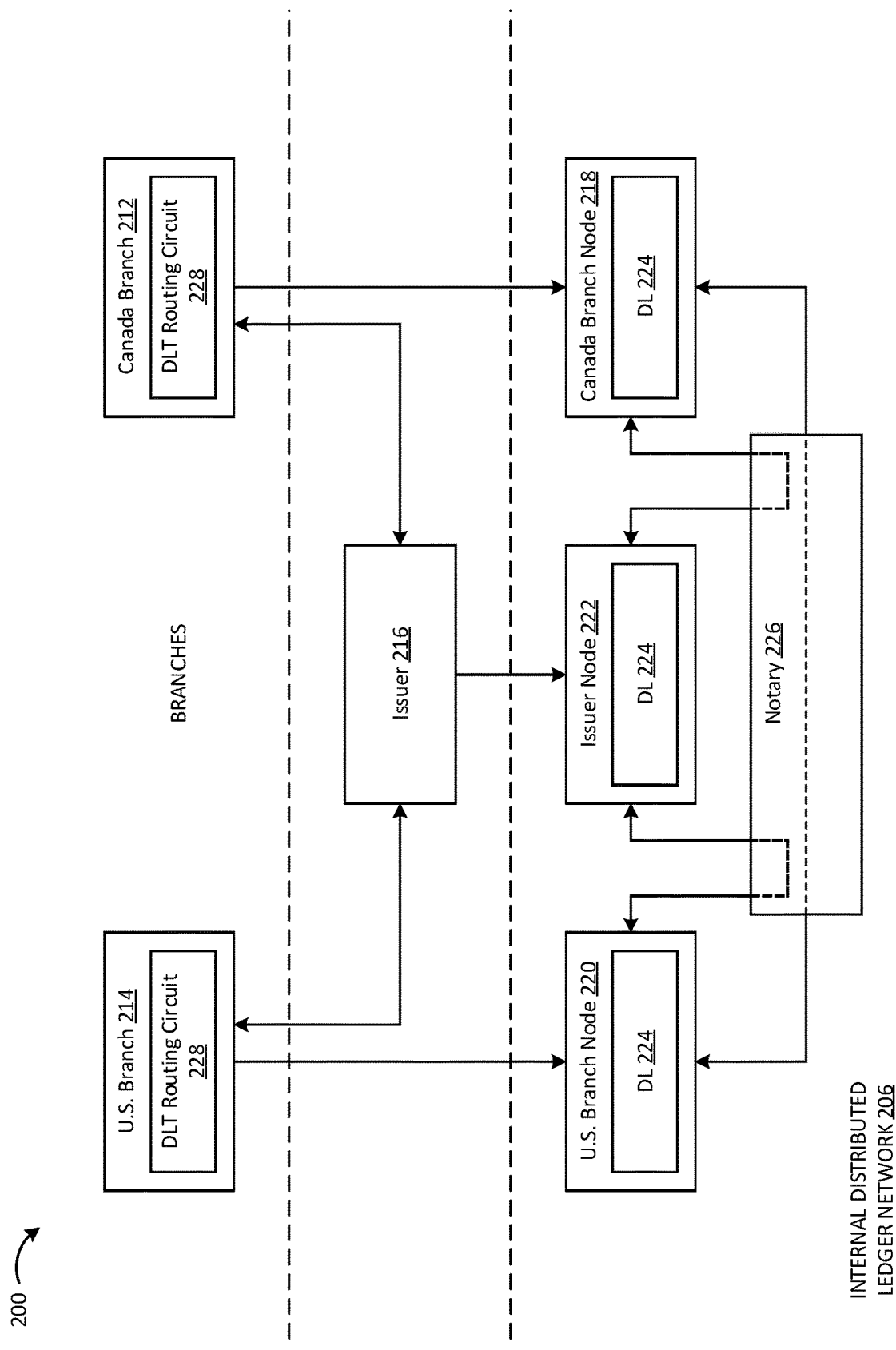
FIG. 2 is a functional block diagram of a system for facilitating cross-border payments via a distributed ledger technology-based payment rail, according to an example embodiment.
Figure 4:
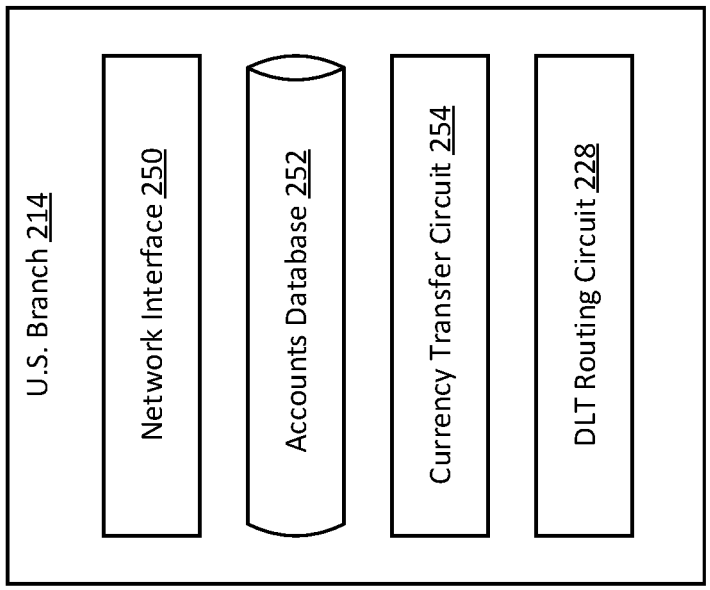
FIG. 4 is a detailed schematic diagram of a U.S. branch of the system of FIG. 2, according to an example embodiment.
Figure 3:
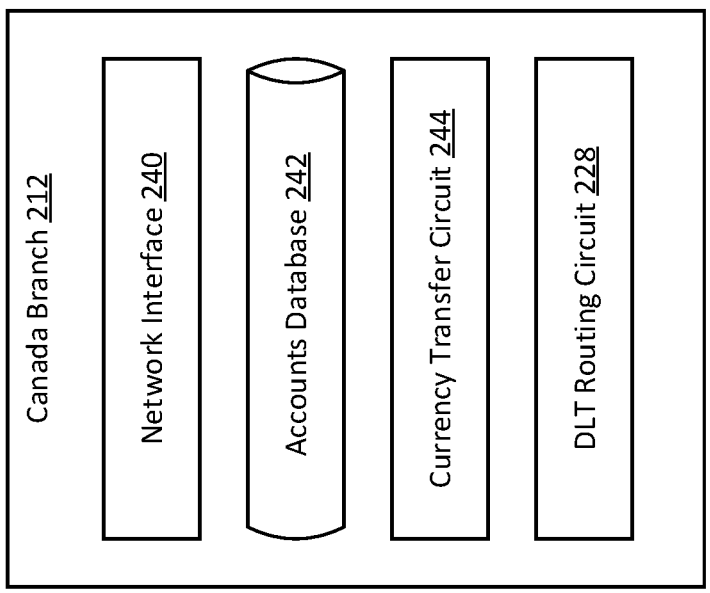
FIG. 3 is a detailed schematic diagram of a Canada branch of the system of FIG. 2, according to an example embodiment.

FIG. 2 is a functional block diagram of a system 200 for facilitating cross-border payments via a DLT-based payment rail, according to an example embodiment. For illustrative purposes, the system 200 is described with respect to a multinational company transferring funds from a first account in a first country to a second account in a second country. In this example, the first and second accounts are held with different branches of the same financial institution. In other words, this example involves a cross-border, intra-bank, inter-branch transfer. As will be appreciated, the funds transfer described in connection with FIGS. 2-4 is similar to the funds transfer described in connection with FIG. 1; however, the mechanism by which the funds transfer is completed is significantly different.

The system 200 can be categorized into three distinct subsystems: (1) branches of a financial institution or separate financial institutions, (2) an issuer 216, and (3) a closed internal DLT network 206. In the embodiment of FIG. 2, the branches include the Canada branch 212 and the U.S. branch 214. The closed internal DLT network 206 includes a Canada branch node 218, a U.S. branch node 220, an issuer node 222, a distributed ledger 224, and a notary 226. However, it should be understood that in other embodiments, similar systems and methods may be used to perform transactions between separate financial institutions, rather than between branches of the same financial institution as shown in FIG. 2 and described below.

The Canada branch 212 operates the Canada branch node 218. The U.S. branch 214 operates the U.S. branch node 220. The issuer 216 operates the issuer node 222. It should be understood that, in reference to the Figures, the Canada branch 212, U.S. branch 214, and issuer 216 may include computing systems configured to automatically or semi-automatically carry out the functions described herein. For example, each of the Canada branch 212, U.S. branch 214, and issuer 216 may include one or more server systems including one or more circuits configured to carry out the functions described herein.

The Canada branch 212 and the U.S. branch 214 each includes a DLT routing circuit 228. The DLT routing circuit 228 is configured to examine payment or funds transfer request messages (e.g., SWIFT MT messages, such as the messages discussed with reference to FIG. 1) and selectively route the messages to the DLT network 206 in response to determining that the sender and the receiver are both members of the DLT network 206. For example, the Canada branch 212 or the U.S. branch 214 receives a funds transfer request message including an amount for the funds transfer, a sender of the funds transfer, and a recipient of the funds transfer. In this example, the Canada branch 212 or the U.S. branch 214 may be associated with either the sender of the funds transfer (e.g., the individual or entity requesting the funds transfer) or the recipient of the funds transfer (e.g., the individual or entity to receive the funds transfer). The DLT routing circuit 228 examines the funds transfer request message to identify a sending financial institution associated with the sender (e.g., the Canada branch 212 or the U.S. branch 214) and a receiving financial institution associated with the recipient (e.g., the other of the Canada branch 212 or the U.S. branch 214) of the funds specified in the message. The DLT routing circuit 228 further determines whether both the sending financial institution and the recipient financial institution are member participants of the DLT network 206. As an illustration, the DLT routing circuit 228 may verify whether the sending financial institution and the receiving financial institution each operates a node on the closed internal DLT network 206, as described in further detail below. As a further illustration, the DLT routing circuit 228 may identify or verify that the sender or recipient (depending on whether the DLT routing circuit 228 is associated with the sending financial institution or the receiving financial institution in the funds transfer) is a customer of the branch associated with the DLT routing circuit 228 and verify that the other financial institution in the funds transfer operates a node on the DLT network 206. In response to determining that the sending financial institution and the receiving financial institution are both member participants of the DLT network 206, the DLT routing circuit 228 re-routes the payment message to the DLT network 206.

In some embodiments, the DLT routing circuit 228 further examines whether the sending financial institution and the receiving financial institution each has sufficient funds to facilitate the funds transfer via cash states. In some embodiments, in response to determining that at least one of the sending or receiving financial institutions does not have sufficient funds to facilitate the funds transfer via cash states, the DLT routing circuit 228 returns a funds transfer failure message. In other embodiments, in response to determining that at least one of the sending or receiving financial institution does not have sufficient funds to facilitate the funds transfer via cash states, the DLT routing circuit 228 routes the payment message to existing payment rails such as SWIFT.

Referring to FIGS. 3 and 4, detailed schematic diagrams of the Canada branch 212 (FIG. 3) and the U.S. branch 214 (FIG. 4) are shown, according to example embodiments. In various embodiments, the Canada branch 212 includes the DLT routing circuit 228, as well as one or more components configured to facilitate the processes described above, such as a network interface 240, a customer accounts database 242, and a currency transfer circuit 244.

The network interface 240 includes program logic and/or components that facilitate connection of the Canada branch 212 to a network (e.g., a secure network). Accordingly, the network interface 240 supports communication between the Canada branch 212 and other components of the system 200, such as the U.S. branch 214 and the issuer 216.

The accounts database 242 is structured to retrievably store information related to various customers of the Canada branch 212. For example, the accounts database 242 may store biographical information about various customers (e.g., names, addresses, birthdays, emails, phone numbers, etc.), account information about various customers (e.g., account balances, account histories, etc.), template or reference access credentials for various customers (e.g., passwords, personal identification numbers ("PINs"), order numbers, biometrics, etc.), and the like. Additionally, in some embodiments, the accounts database 242 retrievably stores information about the Canada branch node 218. For example, the accounts database 242 may retrievably store at least some of the distributed ledger 224. Alternatively, in other embodiments, the Canada branch node 218 and the distributed ledger 224 may be stored and operated separately from the accounts database 242.

The currency transfer circuit 244 is configured to transfer funds from an account held by the Canada branch 212 to an account held by the issuer 216 (e.g., by sending a SWIFT message to the issuer 216) such that the issuer 216 issues cash states to the Canada branch node 218 (e.g., with the transferred funds held in a collateral account). The currency transfer circuit 244 is also configured to facilitate the transfer of funds from the account held by the Canada branch 212 to the account held by the issuer 216 (e.g., by sending a SWIFT message to the issuer 216) such that the issuer destroys cash states from the Canada branch node 218. For example, the currency transfer circuit 244 may facilitate transfer of funds from the account held by the issuer 216 to the account held by the Canada branch 212 such that a customer of the Canada branch 212 may withdraw transferred funds. The currency transfer circuit 244 may also be configured to initiate a transfer funds via the DLT rail. As an example, in response to receiving a request from a customer to transfer funds to the U.S. branch 214, the currency transfer circuit 244 may send a SWIFT message to the U.S. branch 214, which the DLT routing circuit 228 intercepts and reroutes to the closed internal DLT network 206, as discussed above.

Similar to the Canada branch 212, in various embodiments, the U.S. branch 214 includes the DLT routing circuit 228, as well as one or more components configured to facilitate the processes described above, such as a network interface 250, an accounts database 252, and a currency transfer circuit 254. In various embodiments, the network interface 250, accounts database 252, and currency transfer circuit 254 of the U.S. branch 214 are structured similarly to the network interface 240, accounts database 242, and currency transfer circuit 244 of the Canada branch 212 but are associated with an account held by the U.S. branch 214 and the U.S. branch node 220 (e.g., such that the currency transfer circuit 254 is configured to facilitate transfers of currency to and from the account held by the U.S. branch 214). Additionally, in some embodiments, because the Canada branch 212 and the U.S. branch 214 are branches of the same financial institution, one or more components of the Canada branch 212 and the U.S. branch 214 may be combined or implemented in the same computing system. For example, the financial institution may have one accounts database with the information stored therein sorted or partitioned based on whether the information is associated with a customer of the Canada branch 212 or the U.S. branch 214.

Referring back to FIG. 2, the issuer 216 has the role of issuing cash states to the distributed ledger and destroying cash states in response to redemption thereof. Cash states are simply a digital representation of fiat currency cash. Cash states are recorded in a distributed ledger 224 maintained by the participants of the DLT network 206. Cash states can also be described as tokens or tokenized assets. The issuer 216 issues cash states in response to the issuer 216 receiving fiat funds from another bank account, such as an account held by the Canada branch 212 or an account held by the U.S. branch 214. In some embodiments, the fiat funds received by the issuer 216 are held in a collateral account. The issuer 216 also destroys cash states in response to an entity redeeming the cash states (e.g., by defunding an amount of fiat currency cash from the account held by the issuer 216) to retrieve the corresponding fiat funds in the collateral account. For example, the issuer 216 records digital cash states corresponding to a defunded amount of fiat currency cash as destroyed on the DLT network 206, which indicates to the same to the retrieving entity.

All cash states created by the issuer 216 carry the legal identity of the issuer 216. Code related to the role of the issuer 216 exists only in the issuer node 222. The issuer node 222 is protected by a user ID/password and is configured to fulfill its roles via a declarative list of flow operations. As such, no other node is allowed to issue or destroy cash states. Once cash states are issued, the ownership thereof is transferred to a branch.

In addition to issuing and destroying cash states, the issuer 216 plays the role of regulatory oversight of all money movement between nodes. The issuer node 222 retains a copy of information related to payments, and based on this information it can infer the positions of all nodes. The issuer 216 does not have access to the nodes' cash states or sensitive data related to payments.

Figure 5:
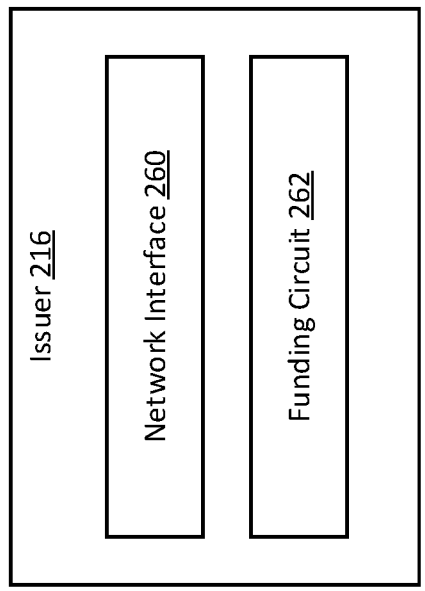
FIG. 5 is a detailed schematic diagram of an issuer branch of the system of FIG. 2, according to an example embodiment.

Referring to FIG. 5, a detailed schematic diagram of the issuer 216 is shown, according to an example embodiment. In various embodiments, the issuer 216 includes a network interface 260 and one or more components configured to perform the functions described above, such as a funding circuit 262. The network interface 260 includes program logic and/or components that facilitate connection of the issuer 216 to a network (e.g., a secure network). Accordingly, the network interface 260 supports communication between the issuer 216 and other components of the system 200, such as the Canada branch 212 and U.S. branch 214.

The funding circuit 262 is configured to issue and destroy cash states to nodes of the distributed ledger. For example, the funding circuit 262 may be configured to receive and record a transfer from the account held by the Canada branch 212 or the U.S. branch 214 to the account held by the issuer 216. In response, the funding circuit 262 issues cash states to the corresponding node on the closed internal DLT network 206 (e.g., the Canada branch node 218 or the U.S. branch node 220). As another example, the funding circuit 262 may be configured to receive a transfer request from the Canada branch 212 or the U.S. branch 214 to transfer funds from the account held by the issuer 216 to the corresponding account held by the Canada branch 212 or the U.S. branch 214. Accordingly, the funding circuit 262 may initiate the transfer of funds and destroy the corresponding cash states held within the node associated with the requesting branch 212 or 214.

Referring back to FIG. 2, the DLT network 206 is an authenticated peer-to-peer network of nodes. All communication between nodes is direct, with encrypted messages sent over secure channels. This means that data is shared only on a need-to-know basis rather than via global broadcasts. The DLT network 206 has a network map service that publishes the IP addresses through which every node on the DLT network 206 can be reached, along with the identity certificates of those nodes and the services they provide.

The DLT network 206 is a semi-private network managed by a doorman (not shown). The doorman enforces rules regarding the information that nodes must provide and the know-your-customer processes that they must complete before being admitted to the DLT network 206. To join the network, a node must contact the doorman and provide the required information. If the doorman is satisfied, the node will receive a root-authority-signed Transport Layer Security ("TLS") certificate from the permissioning service of the DLT network 206. This certificate certifies the node's identity when communicating with other participants on the DLT network 206.

The Canada branch node 218 and the U.S. branch node 220 are each protected by a user ID/password and are configured to receive/return cash states to/from the issuer node 222 and to transfer ownership of cash states to the other of the Canada branch node 218 and the U.S. branch node 220 via a declarative list of flow operations. This solution allows the implementations branch code to be different between branches as long as they adhere to smart contract specifications utilized by the DLT network 206. In one example implementation, the DLT network 206 is implemented on the R3 Corda platform. The Corda platform implements CordApp applications for executing smart contracts. The Corda platform guarantees that branch players do not break the specified rules defined for the DLT network 206.

The notary 226 is a network service that provides uniqueness consensus by attesting that, for a given transaction, the notary 226 has not already signed other transactions that consume any of the proposed transaction's input states. Similar to the Canada branch 212, U.S. branch 214, and issuer 216, it should be understood that, in reference to the Figures, the notary 226 may include computing systems configured to automatically or semi-automatically carry out the functions described herein. For example, the notary 226 may include one or more server systems including one or more circuits configured to carry out the functions described herein.

In response to being sent asked to notarize a transaction, the notary 226 will either: (1) sign the transaction if it has not already signed other transactions consuming any of the proposed transaction's input states or (2) reject the transaction and flag that a double-spend attempt has occurred otherwise. In doing so, the notary 226 provides the point of finality in the system. Until the signature of the notary 226 is obtained, parties cannot be sure that an equally valid, but conflicting, transaction will not be regarded as the "valid" attempt to spend a given input state. However, after the signature of the notary 226 is obtained, one can be sure that the proposed transaction's input states had not already been consumed by a prior transaction. Hence, notarization is the point of finality in the system. As such, the notary 226 may confirm some or all of the transactions taking place on the closed internal DLT network 206, including transfers between the Canada branch node 218 and the U.S. branch node 220 and transfers between the issuer node 222 and the branch nodes 212 and 214. In this way, the Canada branch 212 and the U.S. branch 214 also receive confirmation from the notary 226 that, for example, a funds transfer has been completed once the transactions in the funds transfer have been signed by the notary 226.

Figure 6:
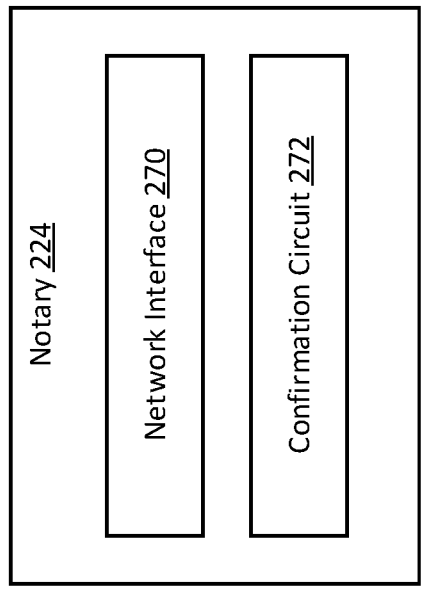
FIG. 6 is a detailed schematic diagram of a notary of the system of FIG. 2, according to an example embodiment.

Referring to FIG. 6, a detailed schematic diagram of the notary 226 is shown, according to an example embodiment. In various embodiments, the notary 226 includes a network interface 270 and one or more components configured to perform the functions described above, such as a confirmation circuit 272. The network interface 270 includes program logic and/or components that facilitate connection of the notary 226 to a network (e.g., a secure network). Accordingly, the network interface 240 supports communication between the Canada branch 212 and other components of the system 200, such as computing systems operating the Canada branch node 218 and the U.S. branch node 220.

The confirmation circuit 272 is configured to receive requests to notarize transactions on the DLT network 206. In response, the confirmation circuit 272 is configured to determine whether the transaction is an original transaction or a double-spend attempt. For example, the confirmation circuit 272 may compare attributes of the transaction, such as the transaction amount and transaction date and time, to attributes of confirmed transactions on the DLT network 206 to identify whether the transaction is original or a double-spend attempt. The confirmation circuit 272 then signs original transactions and rejections double-spend transactions. In some embodiments, the confirmation circuit 272 may confirm all transactions on the DLT network 206. In other embodiments, the confirmation circuit 272 may confirm a subset of transactions on the DLT network 206. For example, the confirmation circuit 272 may confirm transfers between the Canada branch node 218 and the U.S. branch node 220 but not the issue or destroying of cash states by the issuer node 222.

Figure 7:
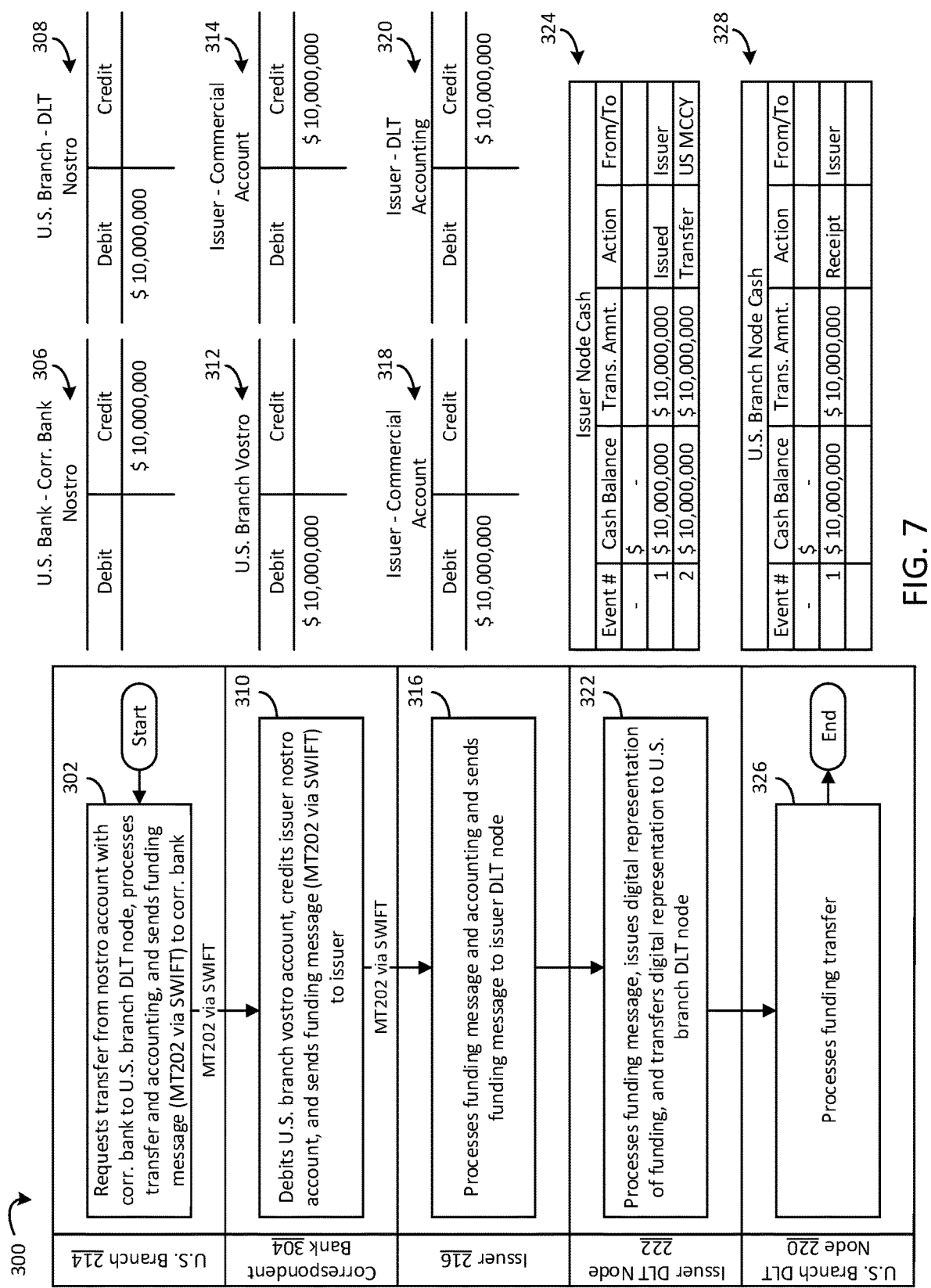
FIG. 7 is a flow diagram of a method of funding a distributed ledger technology account via the system of FIG. 2, and corresponding T-account tables for the funding process, according to an example embodiment.

FIG. 7 is a flow diagram of a method 300 of funding a DLT account via the system 200 of FIG. 2 and corresponding T-account tables for the funding process, according to an example embodiment. In particular, the method 300 relates to the U.S. branch 214 funding a mirrored cash state account on the U.S. branch node 220 of the DLT network 206 with $10,000,000. Pre-funding the DLT account as illustrated in FIG. 7 provides liquidity for the U.S. branch 214 to perform cross-border payments using cash states over the DLT network 206 via the system 200.

At 302, the U.S. branch 214 initiates funding of the U.S. branch node 220 with cash states. The U.S. branch 214 requests a fiat currency cash transfer from a nostro account of the U.S. branch 214 held by a correspondent bank 304. The U.S. branch 214 processes the transfer request and associated accounting and sends a funds transfer request message to the correspondent bank 304. The funds transfer request in this example implementation is a SWIFT MT202 message. Accounting for this step is shown in T-accounts 306, 308. In T-account 306, a nostro account of the U.S. branch 214 held by the correspondent bank 304 is credited $10,000,000. In T-account 308, a nostro account of the U.S. branch 106 held by the U.S. bank node is debited $10,000,000.

At 310, the correspondent bank 304 receives the funds transfer request message from the U.S. branch 214. The correspondent bank 304 debits the vostro account of the U.S. branch 214 and credits the nostro account of the issuer 216. A funding message is sent to the issuer 216. Accounting for this step is shown in T-accounts 312, 314. In T-account 312, a vostro account of the U.S. branch 214 held by the correspondent bank 304 is debited $10,000,000. In T-account 314, a commercial account of the issuer 216 is credited $10,000,000.

At 316, the issuer 216 receives the funding message from the correspondent bank 304. The issuer 216 processes the funding message and associated accounting and sends a funding message to the DLT network 206. Accounting for this step is shown in T-accounts 318, 320. In T-account 318, the commercial account of the issuer 216 is debited $10,000,000. In T-account 320, the DLT ledger is credited $10,000,000.

At 322, the issuer node 222 on the DLT network 206 receives and processes the funding message from the issuer 216. This step is represented in event 1 of ledger 324. This event specifies that $10,000,000 in cash state was issued by the issuer 216 in response to receiving the $10,000,000 from the U.S. branch 214. The issuer 216 maintains a cash balance of $10,000,000, which is mirrored by the recently issued $10,000,000 in cash state. Additionally, at 322, the issuer node 222 transfers the $10,000,000 in cash state to the U.S. branch node 220. This step is represented in event 2 of ledger 324. This event specifies that the $10,000,000 in cash state was transferred by the issuer node 222 to the U.S. branch node 220. The issuer 216 maintains the cash balance of $10,000,000.

At 326, the U.S. branch node 220 processes the funding transfer. This step is represented in event 1 of ledger 328. This event specifies that $10,000,000 in cash state was received by the U.S. branch node 220 from the issuer 216.

Figure 8:
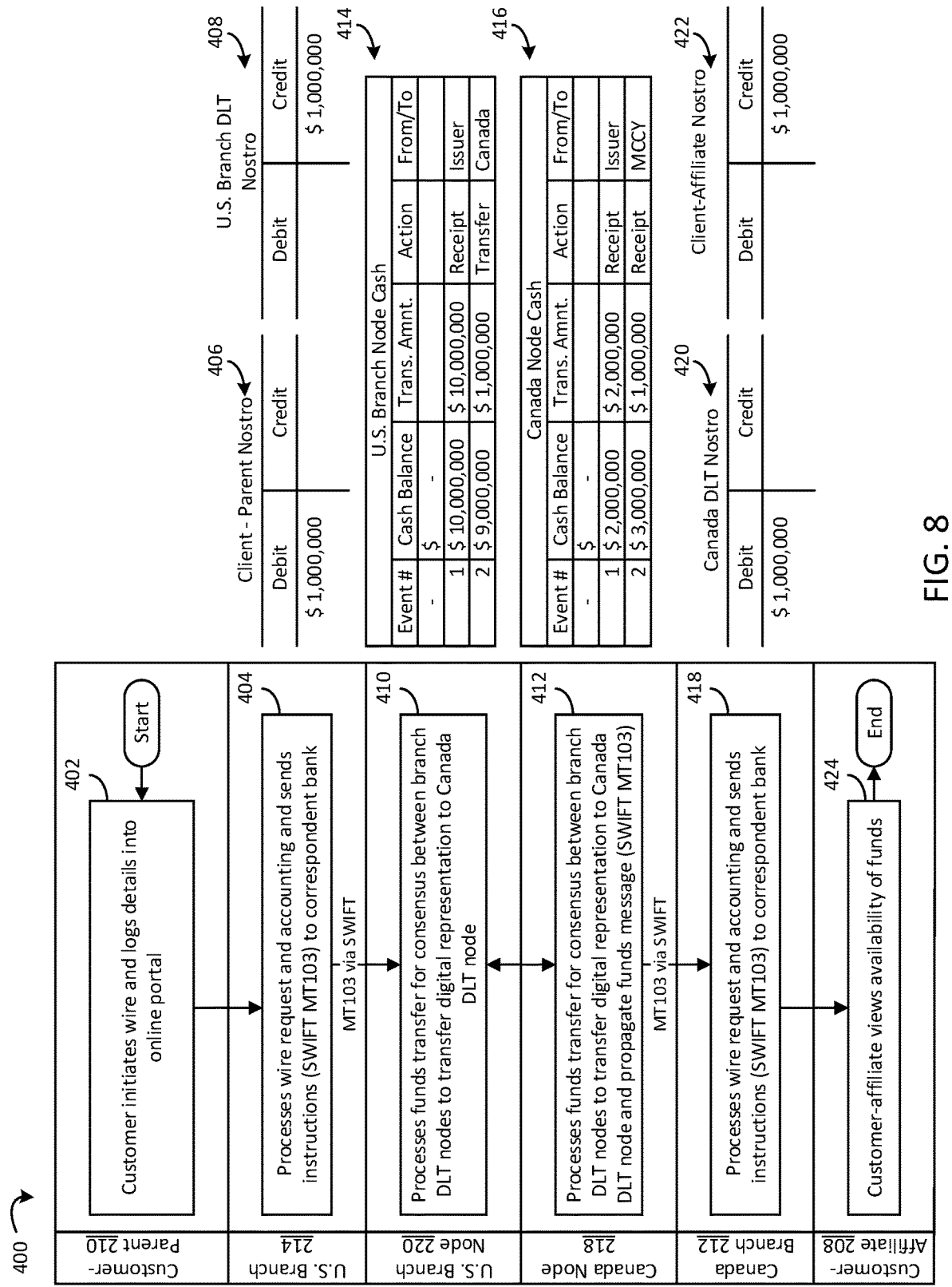
FIG. 8 is a flow diagram of a method of performing a cross-border interbank funds transfer over a distributed ledger technology-based payment rail via the system of FIG. 2, and corresponding T-account tables for the funds transfer, according to an example embodiment.

FIG. 8 is a flow diagram of a method 400 of performing a cross-border, intra-bank funds transfer over a DLT-based payment rail via the system 200 of FIG. 2 and corresponding T-account tables for the funds transfer, according to an example embodiment. Similar to the example transaction illustrated in FIG. 1, the example illustrated in FIG. 4 relates to a U.S.-based multi-national company transferring $1,000,000 from a U.S.-based account 210 (labeled in FIG. 8 as "Customer-Parent") to a Canada-based account 208 (labeled in FIG. 8 as "Customer-Affiliate"). The U.S.-based account 210 is held with the U.S. branch 214 of a financial institution, and the Canada-based account 208 is held with the Canada branch 212 of the financial institution. In other words, this example involves a cross-border, intra-bank, inter-branch transfer. The cross-border, intra-bank, inter-branch transfer is facilitated via the DLT network 206. In this example, the mirrored DLT cash state account on the U.S. branch node 220 has been prefunded with $10,000,000 of cash state (e.g., via the method 300 of FIG. 7) and the mirrored DLT cash state account on the Canada branch node 218 has been prefunded with $2,000,000 of cash state.

At 402, the customer-parent initiates a wire transfer from the U.S.-based account 210 to the Canada-based account 208. For example, the customer-parent may initiate the wire by logging into an online banking platform and submitting the wire transfer request.

At 404, the U.S. branch 214 processes the wire transfer request and associated accounting, and sends payment instructions to a payment network. In the example illustrated in FIG. 1, the payment network is SWIFT and the payment instructions are sent via an MT103 payment message. However, the DLT routing circuit 228 of the U.S. branch 214 receives the MT103 message including the payment instructions. The DLT routing circuit 228 examines the sender and the recipient of funds specified in the MT103 message and determines that both the sending financial institution associated with the sender (the U.S. branch 214) and the receiving financial institution associated with the recipient (the Canada branch 212) are member participants of the DLT network 206. In response to determining that the sending and the receiving financial institutions are both member participants of the DLT network 206, the DLT routing circuit 228 re-routes the MT103 message to the U.S. branch node 220 of the DLT network 206.

Accounting for this step is shown in T-accounts 406, 408. In T-account 406, the nostro account of the customer-parent is debited $1,000,000. In T-account 408, the nostro account of the U.S. branch node 220 is credited $1,000,000.

At 410, the U.S. branch node 220 receives the payment instructions from the U.S. branch 214. The U.S. branch node 220 processes the funds transfer by submitting the funds transfer to the DLT network 206 for consensus.

At 412, the Canada branch node 218, which is also a member participant of the DLT network 206 also participates in achieving consensus for the funds transfer. Depending on the implementation, other members of the DLT network 206 may also participate in establishing consensus for the funds transfer. In response to achieving consensus for the funds transfer, the distributed ledger is revised to reflect the funds transfer. The Canada branch node 218 propagates and transfers an MT103 payment message to the Canada branch 212. Additionally, the notary 226 participates in the consensus by signing the transactions involved in the funds transfer to confirm that the funds transfer has been completed.

The cash state funds transfer at 412 is reflected in tables 414, 416. Table 414 illustrates the cash state ledger of the U.S. branch node 220. Event 1 is the funding event in which the issuer node 222 funded the U.S. branch node 220 with $10,000,000 in cash state in response to an account held by the issuer 216 receiving $10,000,000 from the an account held by the U.S. branch 214 (e.g., as shown at 326 of FIG. 3). Event 2 reflects the transfer of $1,000,000 in cash state from the U.S. branch node 220 to the Canada branch node 218.

Table 414 illustrates the cash state ledger of the U.S. branch node 220. Event 1 is the funding event in which the issuer node 222 funded the U.S. branch node 220 with $10,000,000 in cash state in response to the account held by the issuer 216 receiving $10,000,000 from the Canada branch 212. Event 2 reflects the transfer (i.e., a debit) of $1,000,000 in cash state from the U.S. branch node 220 to the Canada branch node 218, which brings the cash state balance of the U.S. branch node 220 to $9,000,000 in cash state.

Table 416 illustrates the cash state ledger of the Canada branch node 218. Event 1 is the funding event in which the issuer node 222 funded the Canada branch node 218 with $2,000,000 in cash state in response to the account held by the issuer 216 receiving $2,000,000 from the Canada branch 212 (e.g., in a process similar to the method 300 of FIG. 7). Event 2 reflects the receipt (i.e., a credit) of $1,000,000 in cash state by the Canada branch node 218 from the U.S. branch node 220, which brings the cash state balance of the Canada branch node 218 to $3,000,000 in cash state.

At 418, the Canada branch 108 receives the MT103 payment message from the Canada branch node 218 and processes accounting for the transfer. Accounting for this step is shown in T-accounts 420, 422. In T-account 420, the nostro account for the Canada branch node 218 is debited $1,000,000. In T-account 422, the nostro account for the customer-affiliate (the Canada-based account 208) is credited $1,000,000. At 424, the customer-affiliate can view the availability of the $1,000,000 received from the customer-parent via the DLT transfer.

However, it should be understood that, while in the Figures shown herein, the Canada branch 212 and the U.S. branch 214 are branches of the same parent financial institution such that the processes described with respect to the Figures are cross-border, intra-bank, inter-branch transfers, similar systems and processes may be used to facilitate cross-border, inter-bank transfers. For example, two separate partner banks may use the DLT network 206 to conduct transfers, with both partner banks having separate permissioned access to the DLT network 206. As such, the partner banks may perform similar processes as described above with reference to FIGS. 7 and 8 to fund nodes held by the partner banks on the DLT network 206 and to conduct transfers between the partner banks using the DLT network 206. It should also be understood that while the branch 212 and the branch 214 are located in Canada and the United States, respectively, these countries are intended to be exemplary. The systems and processes described herein may be used to conduct funds transfers and other payments more generally between a first financial institution located in a first country and a second financial institution located in a second country.

Additionally, it should be understood that the system 200 and methods 300 and 400 may be extended for other uses. As an illustration, an intraday credit line may be implemented in the system 200. The intraday credit line allows branches (e.g., the Canada branch 212 and the U.S. branch 214) to accept payment beyond the available limits established. For example, the Canada branch 212 and the U.S. branch 214 may spend more than the amount of cash states held in the Canada branch node 218 and the U.S. branch node 220 (e.g., up to a certain credit limit). As payments flow between the branches throughout the day, at the end of the day, it will be expected that one branch will have an excess of credit tokens and the other will be in deficit. The branch in deficit must inject cash via a DLT settlement operation, and the branch in excess must remove cash via a DLT withdraw operation. For example, the U.S. branch node 220 may be funded with $10 million and the Canada branch node 218 may be funded with $3 million. However, at the end of the business day, the U.S. branch node 220 may include a deficit of $1 million in credit tokens (e.g., such that the U.S. branch node 220 has transferred a total of $11 million to the Canada branch node 218 over the business day), and the Canada branch node 218 may correspondingly include an excess of $1 million in credit tokens (e.g., such that the Canada branch node 218 includes a total of $3 million in cash states and $1 million in credit tokens). As such, the U.S. branch 214 may be required to transfer an additional $1 million to the issuer 216 at the end of the business day such that the issuer 216 issues an additional $1 million in cash states to the U.S. branch node 220, thereby bringing the balance of the U.S. branch node 220 to $0. Similarly, the Canada branch 212 may be required to withdraw $1 million from the issuer 216 such that the issuer destroys the $1 million in credit tokens from the Canada branch node 218, bringing the balance of the Canada branch node 218 to $3 million.

Figure 9:
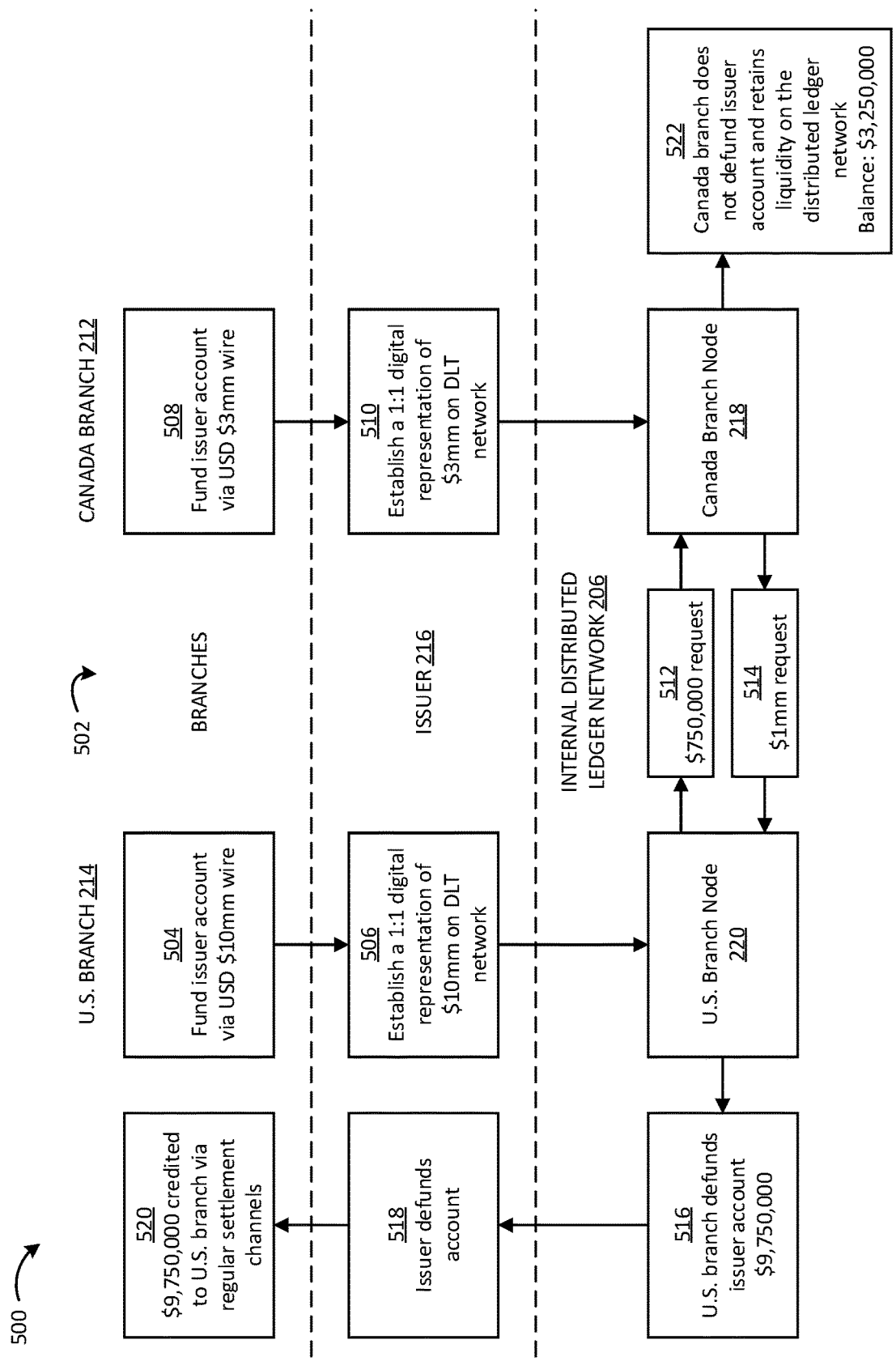
FIG. 9 is another functional block diagram of a system for facilitating cross-border payments via a distributed ledger technology-based payment rail, according to an example embodiment.

FIG. 9 is another functional block diagram of a system 500 for facilitating cross-border payments via a DLT-based payment rail, according to an example embodiment. As shown, the system 500 includes various components of the system 200 of FIG. 2, including the Canada branch 212, the U.S. branch 214, the issuer, and the internal distributed ledger network 206, which further includes the Canada branch node 218 and the U.S. branch node 220. The system 500 is configured to perform an example method 502 for cross-border transfers.

At 504, the U.S. branch 214 funds an issuer account via a USD $10 million wire (e.g., transferred from an account held by the U.S. branch 214). At 506, the issuer 216, in response to the wire, establishes a 1:1 digital representation of the $10 million on the DLT network 206. For example, the issuer 216 issues cash states representing $10 million to the U.S. branch node 220 associated with the U.S. branch 214.

Similarly, at 508, the Canada branch 212 funds the issuer account via a USD $3 million wire (e.g., transferred from an account held by the Canada branch 212). At 510, the issuer 216, in response to this second wire, establishes a 1:1 digital representation of the $3 million on the DLT network 206. For example, the issuer 216 issues cash states representing $3 million to the Canada branch node 218 associated with the Canada branch 212.

At 512, the U.S. branch node 220 transmits a $750,000 request to the Canada branch node 218. For example, the U.S. branch node 220 may transmit the $750,000 request in response to the U.S. branch 214 receiving a message via the DLT network 206 (e.g., through a secure communication channel associated with the distributed ledger) indicating a desired transfer of $750,000 from a customer associated with the Canada branch 212 to a customer associated with the U.S. branch 214. As another example, the U.S. branch node 220 may transmit the $750,000 request as a batch request comprised of a number of smaller transaction requests from a customer of the Canada branch 212 to a customer of the U.S. branch 214. As a third example, the U.S. branch node 220 may transmit the $750,000 request to consolidate internal funds held by the financial institution associated with both the U.S. branch 214 and the Canada branch 212.

At 514, the Canada branch node 218 transmits a $1 million request to the U.S. branch node 220. For example, the Canada branch node 218 may transmit the $1 million request in response to the Canada branch 212 receiving a message via the DLT network 206 (e.g., through a secure communication channel associated with the distributed ledger) indicating a desired transfer of $1 million from a customer associated with the U.S. branch 214 to a customer associated with the Canada branch 212. In other examples, the Canada branch node 218 may transmit the $1 million request as a batch request or to consolidate internal funds, as described above.

The U.S. branch node 220 carries out the $1 million transfer to the Canada branch node 218, and the Canada branch node 218 carries out the $750,000 transfer to the U.S. branch node 220. As an illustration, the U.S. branch node 220 records a credit of $750,000 and records a debit of $1 million in the cash states held in the U.S. branch node 220. The Canada branch node 218 similarly records a debit of $750,000 and records a credit of $1 million in the cash states held in the Canada branch node 218. A notary (e.g., notary 226) may verify that these are original transactions and sign the transactions, after which the transferred cash states are available to the U.S. branch node 220 and the Canada branch node 218. Thus, after the transfer, the total cash states in the U.S. branch node 220 are $9,750,000, and the total cash states in the Canada branch node 218 are $3,250,000.

At 516, the U.S. branch 214 defunds the issuer account of $9,750,000. For example, the U.S. branch 214 sends a request to the issuer 216 to redeem all of the cash states in the U.S. branch node 220 at the end of a business day. At 518, the issuer 216 defunds the issuer account. As an example, the issuer 216 destroys the cash states in the U.S. branch node 220, which correspond to $9,750,000 currently held by the issuer 216, and the issuer 216 transfers $9,750,000 from the issuer account to the account held by the U.S. branch 214. At 520, the $9,750,000 is accordingly credited to the U.S. branch 214 via regular settlement channels.

However, at 522, the Canada branch 212 elects not to defund the issuer account. Instead, the Canada branch 212 retains the cash states in the Canada branch node 218, thereby retaining liquidity on the DLT network 206 with a balance of $3,250,000. It should be understood that, while the Canada branch 212 and the U.S. branch 214 are branches of the same financial institution in FIG. 9, similar processes to method 502 may be used to facilitate cross-border, inter-bank transfers and to facilitate cross-border transfers between a first country and a second country more broadly.

Figure 10:
FIG. 10 is an issuer view of a user interface for facilitating a cross-border payment between a U.S. branch and a Canada branch via a distributed ledger technology-based payment rail, according to an example embodiment.

FIG. 10 is an issuer view (e.g., for the issuer 216) of a user interface 600 for facilitating a cross-border payment between a U.S. branch (e.g., the U.S. branch 214) and a Canada branch (e.g., the Canada branch 212) via a DLT-based payment rail, according to an example embodiment. The user interface 600 includes a section 602 indicating the collateral balance for the Canada branch 212 in USD. In the example of FIG. 6, the collateral balance of the Canada branch 212 is $3,000,000.00 (e.g., corresponding to the funding of the Canada branch node 218 at 508 and 510 of method 502). The user interface 600 also includes a section 604 indicating the collateral balance for the U.S. branch 214 in USD. In the example of FIG. 6, the collateral balance of the U.S. branch 214 is $10,000,000.00 (e.g., corresponding to the funding of the U.S. branch node at 504 and 506 of method 502).

The user interface 600 further includes a table 608 showing a record of transactions between branches and the issuer 216. The transactions shown in the table 608 may be further filtered by date and time using a search function 610. In the example of FIG. 10, the transactions have been filtered to show transactions between Sep. 14, 2018 at 8:00 AM ET and Sep. 14, 2018 at 6:00 PM ET. The transactions accordingly shown in the table 608 include the issuance of $10,000,000.00 USD of cash states by the issuer to the U.S. branch 214 on Sep. 14, 2018 at 9:02 AM ET (e.g., responsive to receiving a transfer from an account held by the U.S. branch 214 to an account held by the issuer 216). The table 608 also includes the issuance of $3,000,000.00 USD of cash states by the issuer to the Canada branch 212 on Sep. 14, 2018 at 9:05 AM ET (e.g., responsive to receiving a transfer from an account held by the Canada branch 212). These transactions also correspond to 506 and 510 of method 502 of FIG. 9.

FIG. 11 is a U.S. branch view (e.g., for the U.S. branch 214) of a user interface 700 for facilitating a cross-border payment between the U.S. branch and a Canada branch (e.g., the Canada branch 212) via a DLT-based payment rail, according to an example embodiment. The user interface 700 includes a section 702 indicating the current balance of cash states in the U.S. branch node 220. In the example of FIG. 11, the current balance shown in section 702 is $0.00.

The user interface 700 also includes a table 704 showing a record of transactions involving the U.S. branch node 220. The transactions shown in the table 704 may be further filtered by date and time using a search function 706. In the example of FIG. 11, the transactions have been filtered to show transactions between Sep. 14, 2018 at 8:00 AM ET and Sep. 14, 2018 at 6:00 PM ET. The table 704 accordingly shows (1) a transaction from the U.S. branch 212 funding the U.S. branch node 220 with $10,000,000.00 on Sep. 14, 2018 at 9:02 AM ET (e.g., corresponding to 506 of method 502), (2) a confirmed transaction of $750,000.00 from the Canada branch 214 on Sep. 14, 2018 at 12:18 PM ET (e.g., corresponding to 512 of method 502), (3) a confirmed transaction of $1,000,000.00 to the Canada branch 214 on Sep. 14, 2018 at 2:30 PM ET (e.g., corresponding to 514 of method 502), and (4) a transaction to the U.S. branch 212 defunding the U.S. branch node 220 of $9,750,000.00 at Sep. 14, 2018 at 5:40 PM ET (e.g., corresponding to 516 and 518 of method 502). The fourth transaction indicates to the U.S. branch 214 that the issuer 216 has destroyed the digital cash states held within the U.S. branch node 220.

The user interface 700 also includes a graph 710 showing the funding level over time of the U.S. branch node 220. The funding level corresponds to the transactions shown in the table 704. In the example of FIG. 11, the graph 710 shows that the funding level increases to $10,000,000.00 at 9:02 AM (corresponding to the funding transaction in the table 704), increases to $10,750,000.00 at 12:18 PM (corresponding to the transfer from the Canada branch 214 in the table 704), decreases to $9,750,000.00 at 2:30 PM (corresponding to the transfer to the Canada branch 214 in the table 704), and decreases to $0.00 at 5:40 PM (corresponding to the defunding of the U.S. branch node 220).

FIG. 12 is a Canada branch view (e.g., for the Canada branch 212) of a user interface 800 for facilitating a cross-border payment between a U.S. branch (e.g., the U.S. branch 214) and the Canada branch via a DLT-based payment rail, according to an example embodiment. The user interface 800 is configured similarly to the user interface 700 and includes a section 802 indicating the current balance of cash states in the Canada branch node 218. In the example of FIG. 12, the current balance shown in section 802 is $3,250,000.00.

The user interface 800 also includes a table 804 showing a record of transactions involving the Canada branch node 218. The transactions shown in the table 804 may be further filtered by date and time using a search function 806. In the example of FIG. 11, the transactions have been filtered to show transactions between Sep. 14, 2018 at 8:00 AM ET and Sep. 14, 2018 at 6:00 PM ET. The table 804 accordingly shows (1) a transaction from the Canada branch 214 funding the Canada branch node 218 with $3,000,000.00 at Sep. 14, 2018 at 9:05 AM ET (e.g., corresponding to 510 of method 502), (2) a confirmed transaction of $750,000.00 to the U.S. branch 214 at Sep. 14, 2018 at 12:18 PM ET (e.g., corresponding to 512 of method 502), and (3) a confirmed transaction of $1,000,000.00 to the Canada branch 214 on Sep. 14, 2018 at 2:30 PM ET (e.g., corresponding to 514 of method 502). As shown in the table 804, unlike the U.S. branch node 220, the Canada branch node 218 was not defunded, and hence the section 802 indicates that $3,250,000.00 remains in the Canada branch node 218 (e.g., corresponding to 522 of method 502).

The user interface 800 also includes a graph 810 showing the funding level over time of the Canada branch node 218. Similar to the graph 710, the funding level corresponds to the transactions shown in the table 804. In the example of FIG. 12, the graph 810 shows that the funding level increases to $3,000,000.00 at 9:05 AM (corresponding to the funding transaction in the table 804), decreases to $2,225,000.00 at 12:18 PM (corresponding to the transfer to the U.S. branch 212 in the table 804), and increases to $3,225,000.00 at 2:30 PM (corresponding to the transfer from the U.S. branch 212 in the table 804).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor, which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. Further, in various arrangements, the functions of one or more circuits discussed above may be implemented by a single circuit (e.g., a processing circuit including a memory and at least one processor), or the functions of one circuit discussed above may be implemented by multiple circuits.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon. Thus, in these arrangements, personal information about the user of the device, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

For the purpose of this disclosure, the term "coupled" means the joining of two members directly or indirectly to one another. Such joining may be achieved with the two members or the two members and any additional intermediate members being integrally formed as a single unitary body with one another, or with the two members or the two members and any additional intermediate members being attached to one another. Such joining may be permanent in nature or may be removable or releasable in nature.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method comprising:
   receiving a funds transfer request message comprising an amount for the funds transfer, a sender of the funds transfer, and a recipient of the funds transfer;
   examining the funds transfer request message to identify a sending financial institution associated with the sender and a receiving financial institution associated with the recipient;
   determining whether the sending financial institution and the receiving financial institution each operates a node on a permissioned distributed ledger network; and
   in response to determining that the sending financial institution and the receiving financial institution each operates a node on the permissioned distributed ledger network, routing the funds transfer request message to the permissioned distributed ledger network, and facilitating the funds transfer via digital cash states issued to the sending financial institution and the receiving financial institution in exchange for fiat currency cash.

2. The method of claim 1, further comprising:
   transferring an amount of fiat currency cash from an account associated with the sending financial institution to an account associated with an issuer of the digital cash states; and
   receiving, at the node operated by the sending financial institution, an amount of digital cash states issued by the issuer corresponding to the transferred amount of fiat currency cash.

3. The method of claim 1, further comprising:
   transferring an amount of fiat currency cash from an account associated with the receiving financial institution to an account associated with an issuer of the digital cash states; and
   receiving, at the node operated by the receiving financial institution, an amount of digital cash states issued by the issuer corresponding to the transferred amount of fiat currency cash.

4. The method of claim 1, further comprising:
   debiting the amount of the funds transfer from the digital cash states issued to the sending financial institution; and
   receiving a confirmation from a notary that the funds transfer has been completed.

5. The method of claim 1, further comprising:
   crediting the amount of the funds transfer in digital cash states within the node operated by the receiving financial institution; and
   receiving a confirmation from a notary that the funds transfer has been completed.

6. The method of claim 1, further comprising:
   defunding an amount of fiat currency cash from an account associated with an issuer of the digital cash states;
   receiving, at the node operated by the sending financial institution, an indication from the issuer that an amount of digital cash states corresponding to the amount of defunded fiat currency cash are destroyed; and receiving, at an account associated with the sending financial institution, the amount of defunded fiat currency cash from the issuer.

7. The method of claim 1, further comprising:
defunding an amount of fiat currency cash from an account associated with an issuer of the digital cash states;
receiving, at the node operated by the receiving financial institution, an indication from the issuer that an amount of digital cash states corresponding to the amount of defunded fiat currency cash are destroyed; and
receiving, at an account associated with the receiving financial institution, the amount of defunded fiat currency cash from the issuer.

8. The method of claim 1, wherein the sending financial institution is located in a first country and the receiving financial institution is located in a second country.

9. The method of claim 1, wherein the sending financial institution and the receiving financial institution are branches of a parent financial institution.

10. The method of claim 1, wherein the sending financial institution and the receiving financial institution are separate financial institutions.

11. A system associated with a sending financial institution in a funds transfer, the sending financial institution operating a node on a permissioned distributed ledger network, the system comprising:
a network interface;
a customer accounts database storing information related to various customers of the sending financial institution; and
a processing circuit comprising a processor and a memory, the memory structured to store instructions that are executable and cause the processor to:
receive the transfer request message comprising an amount for a funds transfer, a sender of the funds transfer, and a recipient of the funds transfer;
examine the funds transfer request message to identify the sender as a customer of the sending financial institution and to identify a receiving financial institution associated with the recipient;
determine whether the receiving financial institution operates a node on the permissioned distributed ledger network; and
in response to determining that the receiving financial institution operates a node on the permissioned distributed ledger network, route the funds transfer request message to the permissioned distributed ledger network so as to facilitate the funds transfer via digital cash states issued to the sending financial institution and the receiving financial institution in exchange for fiat currency cash.

12. The system of claim 11, wherein the instructions further cause the processor to:
transfer an amount of fiat currency cash from an account associated with the sending financial institution to an account associated with an issuer of the digital cash states; and
receive, at the node operated by the sending financial institution, an amount of digital cash states issued by the issuer corresponding to the transferred amount of fiat currency cash.

13. The system of claim 11, wherein the instructions further cause the processor to:
debit the amount of the funds transfer from the digital cash states issued to the sending financial institution; and receive a confirmation from a notary that the funds transfer has been completed.

14. The system of claim 11, wherein the instructions further cause the processor to:
defund an amount of fiat currency cash from an account associated with an issuer of the digital cash states;
receive, at the node operated by the sending financial institution, an indication from the issuer that an amount of digital cash states corresponding to the amount of defunded fiat currency cash are destroyed; and
receive, at an account associated with the sending financial institution, the amount of defunded fiat currency cash from the issuer.

15. The system of claim 11, wherein the sending financial institution is located in a first country and the receiving financial institution is located in a second country.

16. A system associated with a receiving financial institution in a funds transfer, the receiving financial institution operating a node on a permissioned distributed ledger network, comprising:
a network interface;
a customer accounts database storing information related to various customers of the receiving financial institution; and
a processing circuit comprising a processor and a memory, the memory structured to store instructions that are executable and cause the processor to:
receive the transfer request message comprising an amount for a funds transfer, a sender of the funds transfer, and a recipient of the funds transfer;
examine the funds transfer request message to identify the recipient as a customer of the receiving financial institution and to identify a sending financial institution associated with the sender;
determine whether the sending financial institution operates a node on the permissioned distributed ledger network; and
in response to determining that the sending financial institution operates a node on the permissioned distributed ledger network, route the funds transfer request message to the permissioned distributed ledger network so as to facilitate the funds transfer via digital cash states issued to the sending financial institution and the receiving financial institution in exchange for fiat currency cash.

17. The system of claim 16, wherein the instructions further cause the processor to:
transfer an amount of fiat currency cash from an account associated with the receiving financial institution to an account associated with an issuer of the digital cash states; and
receive, at the node operated by the receiving financial institution, an amount of digital cash states issued by the issuer corresponding to the transferred amount of fiat currency cash.

18. The system of claim 16, wherein the instructions further cause the processor to:
credit the amount of the funds transfer in digital cash states within the node operated by the receiving financial institution; and
receive a confirmation from a notary that the funds transfer has been completed.

19. The system of claim 16, wherein the instructions further cause the processor to:
defund an amount of fiat currency cash from an account associated with an issuer of the digital cash states;

receive, at the node operated by the receiving financial institution, an indication from the issuer that an amount of digital cash states corresponding to the amount of defunded fiat currency cash are destroyed; and receive, at an account associated with the receiving financial institution, the amount of defunded fiat currency cash from the issuer.

20. The system of claim 16, wherein the sending financial institution is located in a first country and the receiving financial institution is located in a second country.

\* \* \* \* \*